United States Patent
Lejeune (10) Patent No.: US 9,348,400 B2
(45) Date of Patent: May 24, 2016

(54) METHOD FOR SAVING POWER ON MULTI-CHANNEL DEVICES

(71) Applicant: BROADCOM CORPORATION, Irvine, CA (US)

(72) Inventor: André Lejeune, Chelsea (CA)

(73) Assignee: Broadcom Corporation, Irvine, CA (US)

( * ) Notice: Subject to any disclaimer, the term of this patent is extended or adjusted under 35 U.S.C. 154(b) by 284 days.

(21) Appl. No.: 13/863,332

(22) Filed: Apr. 15, 2013

(65) Prior Publication Data

US 2014/0310542 A1 Oct. 16, 2014

(51) Int. Cl.
*G06F 1/32* (2006.01)
*H04L 12/12* (2006.01)

(52) U.S. Cl.
CPC .............. *G06F 1/3234* (2013.01); *H04L 12/12* (2013.01); *Y02B 60/31* (2013.01)

(58) Field of Classification Search
CPC ........ Y02B 60/36; Y02B 60/45; Y02B 60/31; Y02B 60/32; Y02B 60/33; Y02B 60/34; Y02B 60/50; H04W 52/02; H04W 52/0251; H04W 52/0274; H04W 52/028
See application file for complete search history.

(56) References Cited

U.S. PATENT DOCUMENTS

| | | | | |
|---|---|---|---|---|
| 8,000,708 B1 * | 8/2011 | Woleben | | 455/436 |
| 8,023,499 B2 * | 9/2011 | Moriwaki et al. | | 370/360 |
| 8,320,435 B2 * | 11/2012 | Zukunft et al. | | 375/222 |
| 8,526,308 B1 * | 9/2013 | Singh | H04W 52/146 | 370/235 |
| 8,620,218 B2 * | 12/2013 | Awad | | 455/41.2 |
| 2006/0218419 A1 * | 9/2006 | Iwamura et al. | | 713/300 |
| 2006/0285494 A1 * | 12/2006 | Li | G06F 1/3203 | 370/235 |
| 2008/0298397 A1 * | 12/2008 | Kwan | H04L 47/10 | 370/477 |
| 2009/0157865 A1 * | 6/2009 | Winter | | 709/224 |
| 2009/0187778 A1 * | 7/2009 | Diab | G06F 1/3209 | 713/322 |
| 2009/0268729 A1 * | 10/2009 | Lai | | 370/389 |
| 2010/0146571 A1 * | 6/2010 | Krupp | | 725/109 |
| 2010/0254444 A1 * | 10/2010 | Clausen et al. | | 375/220 |
| 2011/0270972 A1 * | 11/2011 | Mukherjee | H04L 41/0833 | 709/224 |
| 2012/0082137 A1 * | 4/2012 | Ito | H04L 27/2647 | 370/331 |
| 2012/0117149 A1 * | 5/2012 | Nagpal | G06F 1/3209 | 709/204 |
| 2013/0058237 A1 * | 3/2013 | Schoppmeier | | 370/252 |
| 2013/0294304 A1 * | 11/2013 | Schoppmeier | | 370/311 |
| 2014/0274103 A1 * | 9/2014 | Steer et al. | | 455/454 |
| 2015/0312051 A1 * | 10/2015 | Ling | H04L 12/2801 | 375/222 |

* cited by examiner

*Primary Examiner* — Jaweed A Abbaszadeh
*Assistant Examiner* — Cheri Harrington
(74) *Attorney, Agent, or Firm* — McDermott Will & Emery LLP (57) ABSTRACT

A method for turning a multi-channel link into a power saving mode may include detecting one or more events including a drop in a data throughput of the multi-channel link. In response to the detection of one or more events, data communication through one or more channels of the multi-channel link may be transferred to one or more other channels. The characteristics of the one or more channels may be adjusted to achieve power saving. Data communication through the one or more channels may be resumed at a reduced rate. Some of the one or more other channels of the multi-channel link may be configured to operate in a low-power or shut-down mode while the channels with adjusted characteristics are communicating data at the reduced rate.

20 Claims, 5 Drawing Sheets

METHOD FOR SAVING POWER ON MULTI-CHANNEL DEVICES

TECHNICAL FIELD

The present description relates generally to broadband communications, and more particularly, but not exclusively, to a method for saving power on multi-channel devices.

BACKGROUND

Power management is an integral part of many electronic systems and devices. Power management in electronic chips, for example, may be designed with features that allow one or more chips to transition to sleep mode under certain conditions to save power. The transition to sleep mode may be performed by fully or partially shutting down one or more components of the chip which is not in use or is being used under a predefined capacity.

In communication systems, standards exist for adjusting the power consumption on a communication link based on real-time data throughput. For example, in 802.3az standard (e.g., Energy Efficient Ethernet Standard), the receivers and transmitters may be shut down between packet transmissions to save power when no data is transmitted. Such technique cannot be used in all technologies. For example, in very high-speed digital subscriber line (VDSL), it is difficult and sometimes impossible to change the link configuration without losing connection with other connected devices and without going through a lengthy re-training period, during which no packet can be transmitted.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

Figure 1A:
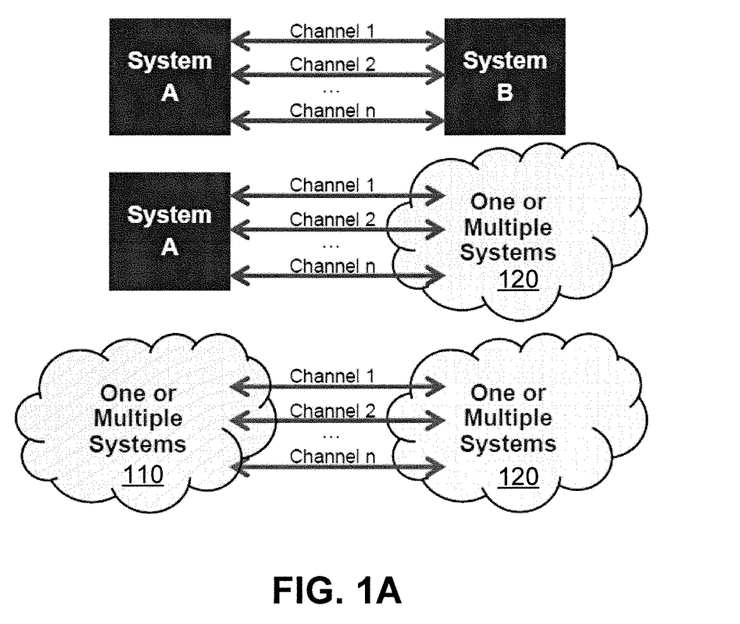
FIG. 1A illustrates examples of systems with multi-channel links in accordance with one or more implementations.

FIG. 1A illustrates examples of systems with multi-channel links in accordance with one or more implementations of the subject technology. The multi-channel link may include a multi-channel link (e.g., channels 1, 2 . . . n) between two systems A and B, where each of the systems A or B may include one or more chips (e.g., silicon chips such as PHY chips) or devices. The devices may include set-top boxes (STSs), such as a Wi-Fi STB, or a gateway, such as a DSL gateway. In one or more implementations, the multi-channel link may connect a system (e.g., system A) with a network-coupled system 120 that may include one or more devices or systems coupled via a network (e.g., the Internet). The multi-channel link may connect two network-coupled systems (e.g., 110 and 120). The multi-channel link may include a multi-channel link between two digital subscriber line (DSL) equipments such as a DSL operator equipment or a DSL customer equipment, and the DSL equipments may be very high-speed DSL (VDSL) equipments.

Figure 1B:
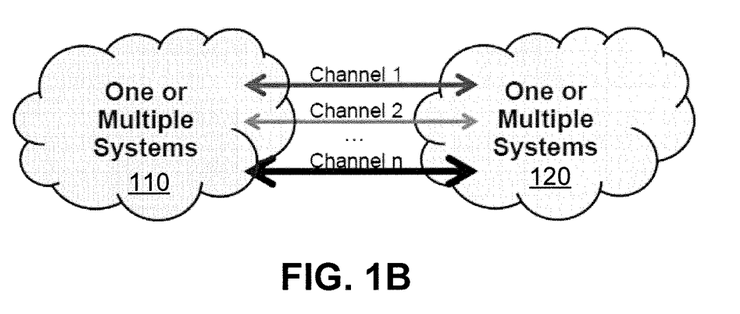
FIG. 1B illustrates an example multi-channel link with channels of different type in accordance with one or more implementations.

FIG. 1B illustrates an example multi-channel link with channels of different types in accordance with one or more implementations of the subject technology. The multi-channel link may couple a network-coupled system 110 with another network-coupled system 120. Each channel (e.g., channels 1, 2 . . . n) of the multi-channel link may be of a different type of channel. For example, one or more channels may include Wi-Fi channels, whereas other channels may include optical, Ethernet, or DSL channels. The channel types may also include channels with different frequencies, wavelengths, or bandwidths, or channels with different modulation or coding schemes. In one or more aspects, the multi-channel link with channels of different types may couple two systems (e.g., systems A and B of FIG. 1A), two devices or two chips.

Figure 1C:
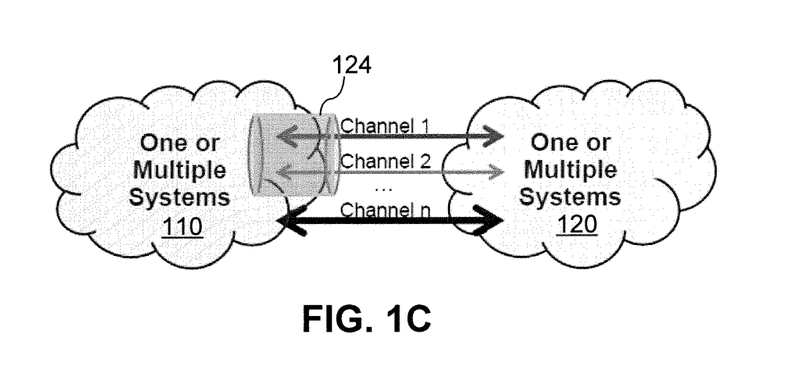
FIG. 1C illustrates an example multi-channel link with one or more channels originating from the same interface medium in accordance with one or more implementations.

FIG. 1C illustrates an example multi-channel link with one or more channels originating from the same interface medium in accordance with one or more implementations of the subject technology. The multi-channel link (e.g., channels 1, 2 . . . n) may couple a network-coupled system 110 with another network-coupled system 120. One or more channels (e.g., channels 1, 2) of the multi-channel link may originate from an interface medium 124. The other channels of the multi-channel link may be originating from one or more common or individual interface media. The interface medium 124 may include a port or a PHY interface including an optical communication interface, a Wi-Fi interface, an Ethernet interface, or a DSL interface. For example, channels 1 and 2 may include two different Wi-Fi bands that share a common Wi-Fi interface (e.g., transceiver) or two different optical wavelength sharing a common optical interface (e.g., optical transceiver). In one or more aspects, the multi-channel link of FIG. 1C may couple two systems (e.g., systems A and B of FIG. 1A), two devices or two chips. In one or more implementations, channels 1 and 2 may also end in a common interface medium, not shown in FIG. 1C for simplicity.

Figure 2A:
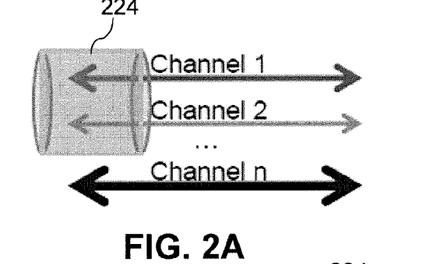
FIGS. 2A-2C illustrate examples of multi-channel links with changing channel characteristics in accordance with one or more implementations.
Figure 2B:
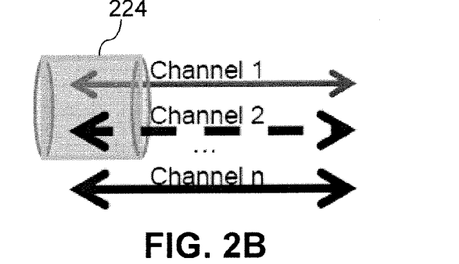
Figure 2C:
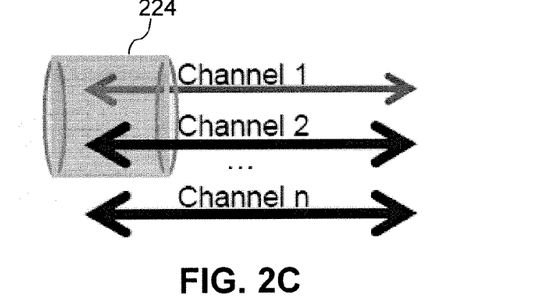

FIGS. 2A-2C illustrate examples of multi-channel links with changing channel characteristics in accordance with one or more implementations of the subject technology. Two channels (e.g., channels 1 and 2) of the multi-channel links (e.g., with channels 1, 2 ... n) shown in FIGS. 2A-2C share a common interface medium 224 similar to the interface medium 124 of FIG. 1C. In FIG. 2A the channels 1 and 2 may be handling less traffic load than other channels, as indicated by the lower thickness of the corresponding channel lines, and may be working in low power mode. In changing the characteristics of a channel (e.g., channel 2), for example, from a low power mode to normal power (e.g., on mode), the traffic on that channel may be affected (as shown by broken lines in FIG. 2B). However, the multi-channel link is not disrupted by this change in characteristics of channel 2, as other channels can carry the traffic load while channel 2 is affected by the transition to an on mode. FIG. 2C shows the multichannel link after the transition of channel 2 to normal power (e.g., full load).

Figure 3A:
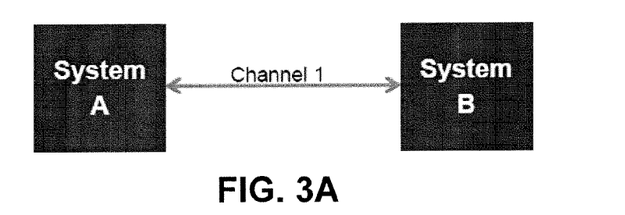
FIGS. 3A-3C illustrate examples of single-channel links with changing channel characteristics.
Figure 3B:
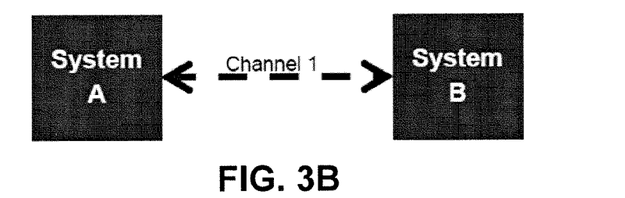
Figure 3C:
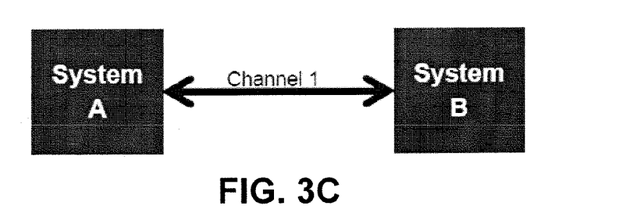

FIGS. 3A-3C illustrate examples of single-channel links with changing channel characteristics. In FIGS. 3A-3C, the single-channel nature of the link between systems A and B does not allow for the protection of the link from disruption when the only channel (e.g., channel 1) experiences a characteristics change, for example, from low power (e.g., FIG. 3A) to normal power (e.g., FIG. 3C). In the transition stage (e.g., FIG. 3B), the link between systems A and B is disrupted and no data can be communicated between systems A and B. This shows that the single-channel link of FIG. 3A cannot tolerate any change in the channel characteristics, such as required for power saving, without connectivity disruption. Therefore, the single-channel link of FIG. 3A has a major disadvantage with respect to the multi-channel links of the subject technology.

Figure 4A:
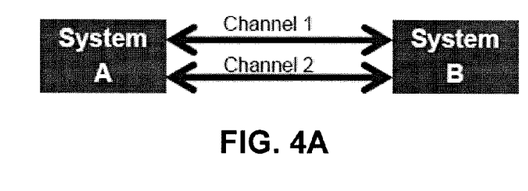
FIGS. 4A-4E illustrate examples of dual-channel links with changing channel characteristics in accordance with one or more implementations.
Figure 4B:
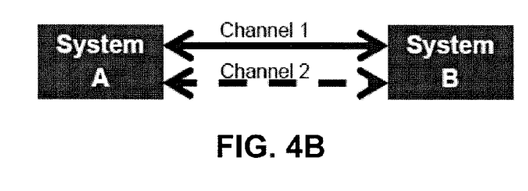
Figures 4C, 4D:
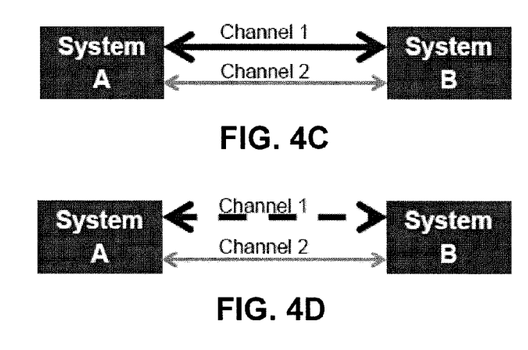
Figure 4E:
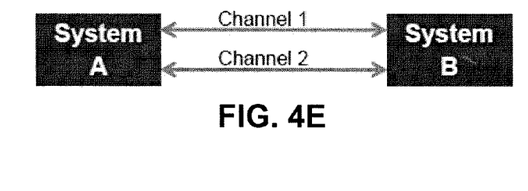

FIGS. 4A-4E illustrate examples of dual-channel links with changing channel characteristics in accordance with one or more implementations of the subject technology. In the dual-channel links such as shown in FIGS. 4A-4E, each of the channels 1 or 2 may experience change in channel characteristics without disruption in connectivity between systems A and B, coupled by the dual channel link. For example, in FIG. 4A both channels 1 and 2 are operating at full load (e.g., normal mode) and, while channel 2 goes through the transition mode (e.g., FIG. 4B) the link connectivity can be preserved by channel 1 that continues to operate at normal mode. FIG. 4C shows that channel 2 has passed the transition mode and entered a low power mode (e.g., shown by a thinner channel line). Characteristics of channel 1 may also be changed from the normal mode to the low power mode (e.g., FIG. 4E) after going through the transition mode shown in FIG. 4D. Therefore, the dual channel link of FIGS. 4A-4E has the advantage of preservation of the connectivity between systems A and B while characteristics of channel A and/or B is changed.

FIGS. 5A-5E illustrate an example of power saving in a dual-channel link in accordance with one or more implementations of the subject technology. The subject technology provides for adjusting link characteristics (e.g., characteristics of channels 1 and 2) to a reduced data throughput without losing connection between systems A and B. For example, when systems A and B are connected through the dual channel links of FIGS. 5A-5E, such as in VDSL bonding, once the data throughput of the link drops below a certain level or in response to one or more other events, the system can transfer data communication through one of the channels (e.g., channel 1 or 2) to the other channel, and adjust its characteristics to achieve a desired goal (e.g., saving power). During the time that the link characteristics are adjusted, no data may pass through that link and instead, all data may be carried over the remaining channels that are still connected. After the channel characteristics adjustments are completed, the data with reduced throughput can be transferred to the adjusted channel, and the remaining channels may be configured to operate in a low-power mode or a shut-down mode to save more power.

Figure 5A:
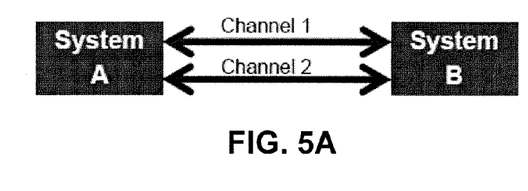
FIGS. 5A-5E illustrate an example of power saving in a dual-channel link in accordance with one or more implementations.
Figure 5B:
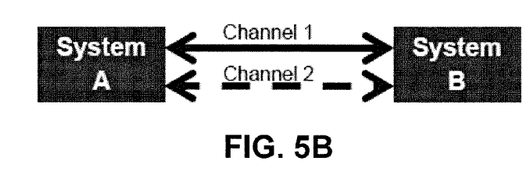
Figures 5C, 5D:
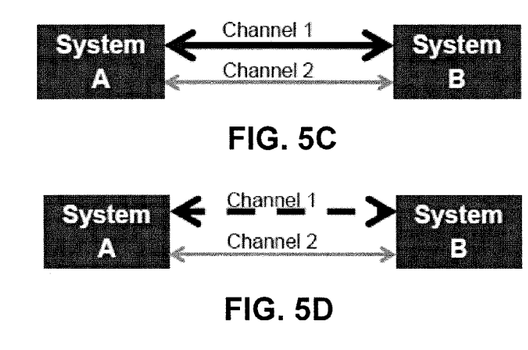

For example, in response to the one or more events including the detection of the drop in data throughput of the dual-channel link between systems A and B of FIG. 5A, data communication through one of the channels, such as channel 2 may be transferred to channel 1 and the characteristics of channel 2 may be changed to a low power mode, as shown in FIG. 5C, after passing through transition mode of FIG. 5B. In the transition mode, adjustment to channel characteristics may be performed, as described in greater detail below. In the low power mode, data communication in channel 2 can be resumed. The one or more events may include detection of a need for a decreased data throughput of the dual-channel link. For example, the need for the decreased data throughput may arise from an imposed situation or a scheduled transition to a lower data rate, for instance, based on existing information. The existing information may include existing statistics on the link traffic during various hours of the day that may indicate a fall in the traffic at a certain time (e.g., in certain hours during the night when many people may not be using the link). As seen during the transition mode, the connectivity between systems A and B is preserved via the channel 1, which is on while channel 2 is in the transition mode. Further power saving may be achieved by shutting down channel 1, while data communication is handled at a reduced rate by channel 2. Before shutting down channel 1, the data communication through channel 1 may be transferred to channel 2 and channel 1 may pass through a transition mode, as shown in FIG. 5D. The shut down (e.g., off) channel 1 is shown with dotted line in FIG. 5E, where the link power consumption is drastically reduced by having channel 1 shut down and channel 2 operating at the reduced throughput (e.g., low power).

FIGS. 6A-6E illustrate an example of recovering from power saving mode in a dual-channel link in accordance with one or more implementations of the subject technology. The subject technology provides for recovering from the power saving mode and resuming data throughput of one or more channels of a multi-channel link that are set in the reduced power mode by allowing adjustment of the characteristics of the channels that are operating in reduced power mode. For example, when a need for an increased data throughput of the multi-channel link is identified, one or more shut-down links can be brought back up to normal mode with characteristics that can increase the overall supported throughput. The channels with reduced throughput can then be brought down and its characteristics adjusted to provide for additional data throughput. Therefore, the recovery can be achieved without disruption of the link connectivity. For example, to recover the link between systems A and B of FIG. 6A from power saving mode, where channel 1 is shut down and channel 2 is operating in the reduced rate mode, the characteristics of channel 1 is adjusted, during a transition mode shown in FIG. 6B, to return to a normal mode of operation, shown in FIG. 6C. The recovery may be completed by returning the reduced-power channel 2 to normal mode, after adjusting characteristics of channel 2, during the transition mode shown in FIG.

Figure 6A:
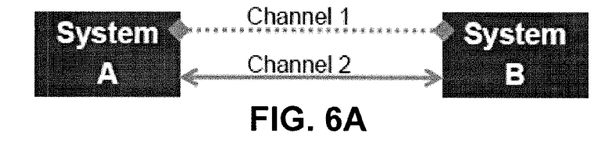
FIGS. 6A-6E illustrate an example of recovering from power saving mode in a dual-channel link in accordance with one or more implementations.
Figure 6B:
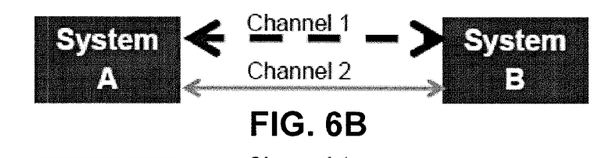
Figure 6C:
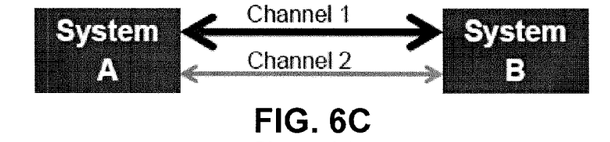
Figure 6D:
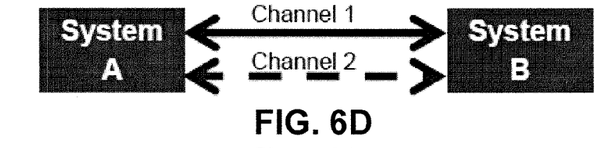
Figure 6E:
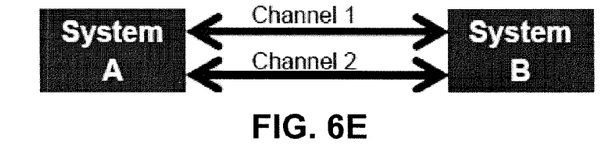

6D. FIG. 6E shows the full recovery of the link from the power saving mode by showing both channels in normal power mode.

Figure 7:
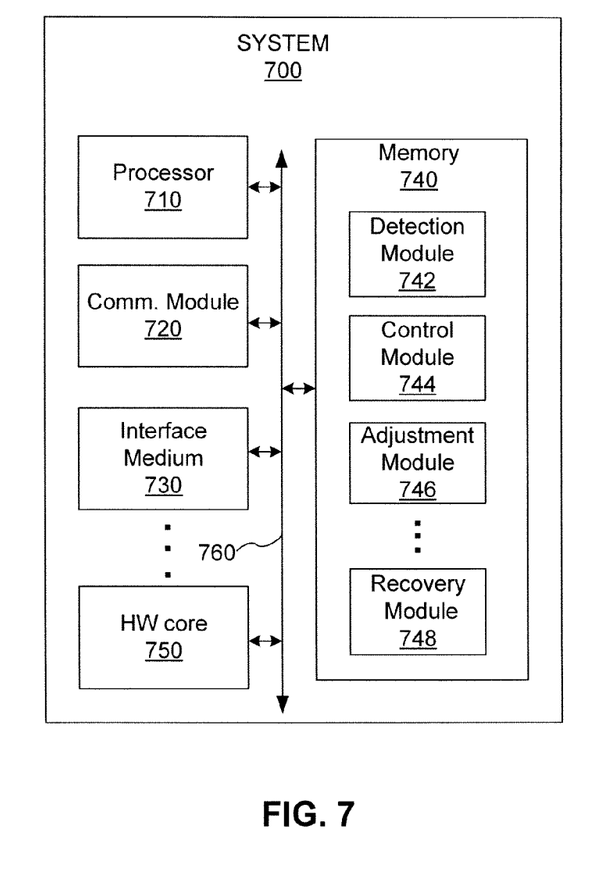
FIG. 7 illustrates an example system for power saving on multi-channel devices in accordance with one or more implementations.

FIG. 7 illustrates an example system 700 for power saving on multi-channel devices in accordance with one or more implementations of the subject technology. The system 700 may include a system A or B of FIGS. 5A-5E, such as a STB including a networked STB (e.g., a STB with one or more network interfaces) or a gateway, for example, a DSL gateway. In one or more aspects, the system 700 may include a DSL equipment such as a DSL operator equipment or a DSL customer equipment, for example, a VDSL equipment. The system 700 may include, but is not limited to, one or more processors 710, a communication module 720, one or more interface medium 730, memory 740, and one or more hardware cores 750, linked via a bus 760. The memory 740 may include multiple data blocks and/or registers and a number of program modules including a detection module 742, a control module 744, an adjustment module 746, and a recovery module 748. In one or more aspects of the subject technology, the processor 710 may execute the program modules including the detection module 742, the control module 744, the adjustment module 746, and the recovery module 748 or may perform the functionalities of the program modules included in memory 740.

The communication module 720 may include one or more transceivers, such as Wi-Fi and/or optical communication transceivers. The interface medium 730 may provide a number of ports for connecting to the system 700 physical channels, such as Ethernet cables, phone lines, high definition multimedia interface (HDMI) cables. In one or more aspects, two or more channels of the multi-channel link may originate from a single port and end in another single port (e.g., 224 of FIG. 2A). The two or more channels may indicate a single physical channel operating at two or more frequency bands or wavelengths.

In one or more implementations of the subject technology, the detection module 742 may be configured to detect one or more events including a drop in a data throughput of the multi-channel link (e.g., channels 1 and 2 of FIG. 5A) connecting system 700 to a similar system (e.g., system A or B). In response to the detection of the drop in the data throughput, the control module 744 may transfer data communication through one or more channels (e.g., channel 2 of FIG. 5B) of the multi-channel link to another channel (e.g., channel 1 of FIG. 5B). The adjustment module 746 may be configured to adjust the characteristics of channel 2 to achieve power saving. The adjustment module 746 may adjust the characteristics of channel 2 by, for example, changing an operating VDSL profile of channel 2. For instance, the adjustment module 746 may change the operating VDSL profile to a low power VDSL profile. The one or more events may include detection of a need for a decreased data throughput of the dual-channel link. For example, the need for the decreased data throughput may arise from an imposed situation or a scheduled transition to a lower data rate, for instance, based on existing information. The existing information may include existing statistics on the link traffic during various hours of the day that may indicate a fall in the traffic at a certain time (e.g., in certain hours during the night when many people may not be using the link).

Figure 5E:
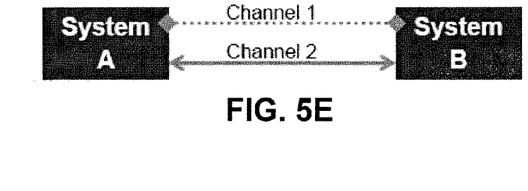

The control module 744 may be configured to resume data communication through channel 2 at a reduced rate to achieve power saving. The control module 744 may further reduce power consumption of the system 700 by shutting down one or more channels, for example, channel 1 of FIG. 5C, while channel 2 is communicating data at the reduced rate. The control module 744 may first transfer data communication through channel 1 to channel 2, as shown in the transition mode of FIG. 5D, before shutting down channel 1, as depicted in FIG. 5E. In one or more aspects, instead of shutting down one or more channels, the control module 744 may reduce data rate of the or more channels so that all channels operate at a reduced rate, as shown, for example, in FIG. 4E.

In one or more implementations of the subject technology, the recovery module 748 may be configured to recover the multi-channel link from the power saving mode. For example, the recovery module 748 may use the detection module 742 to identify a need for an increased data throughput of the multi-channel link (e.g., dual-channel link of FIG. 6A). The identification of the need for the increased data throughput may be based on various information, for example, existing statistics on the link traffic during various hours of the day may indicate a rise in the traffic at a certain time (e.g., in the morning, when many people start using the link). Responding to the identification of the need for the increased data throughput, the recovery module 748 may use the adjustment module 746 to adjust the characteristics of one or more shut-down channels, for example, channel 1 of FIG. 6A to return to a normal mode of operation (e.g., as shown in FIG. 6C). Channel 1 may first go through the transition mode of FIG. 6B, while the adjustment module 746 adjusts the characteristics of channel 1 for the change in the mode of operation of channel 1.

The one or more HW cores 750 may include dedicated cores that execute specific functions such as media (e.g., audio/video) processing, decoding, scaling, 3-D rendering, and so on. One or more processors 710 may be a general-purpose processor (e.g., a central processing unit (CPU)), a graphics processing unit (GPU), a microcontroller, a Digital Signal Processor (DSP), an Application Specific Integrated Circuit (ASIC), an FPGA, a Programmable Logic Device (PLD), a controller, a state machine, gated logic, discrete hardware components, or any other suitable entity that can perform calculations or other manipulations of information. The memory 740 may include random access memory (RAM), dynamic RAM (DRAM), static Ram (SRAM), flash memory, etc.

Once the characteristics of channel 1 are adjusted, the control module 744 may resume data communication at a normal rate through channel 1. The recovery module 748 may use the adjustment module 746 to adjust the characteristics of channel 2 to change from the low power mode, shown in FIG. 6C, to the normal mode of operation depicted in FIG. 6E. During the adjustment period, channel 2 may pass through the transition mode of FIG. 6D. Once channel 2 is in the normal mode of operation, the recovery module 748 may use the control module 744 to resume data communication through channel 2. An advantage of the subject technology is that the system 700 can transition from normal mode of operation to the power saving mode and recover from the power saving mode, without an interruption in connectivity of the link. The benefits of the subject technology are not limited to power saving without connectivity disruption, but may be extended to other applications where the adjustment of characteristics of the channels without loss of connectivity is desired for other purposes. Examples of such application may include reducing mean time between failures and/or possibly improving noise immunity of the link.

Figure 8:
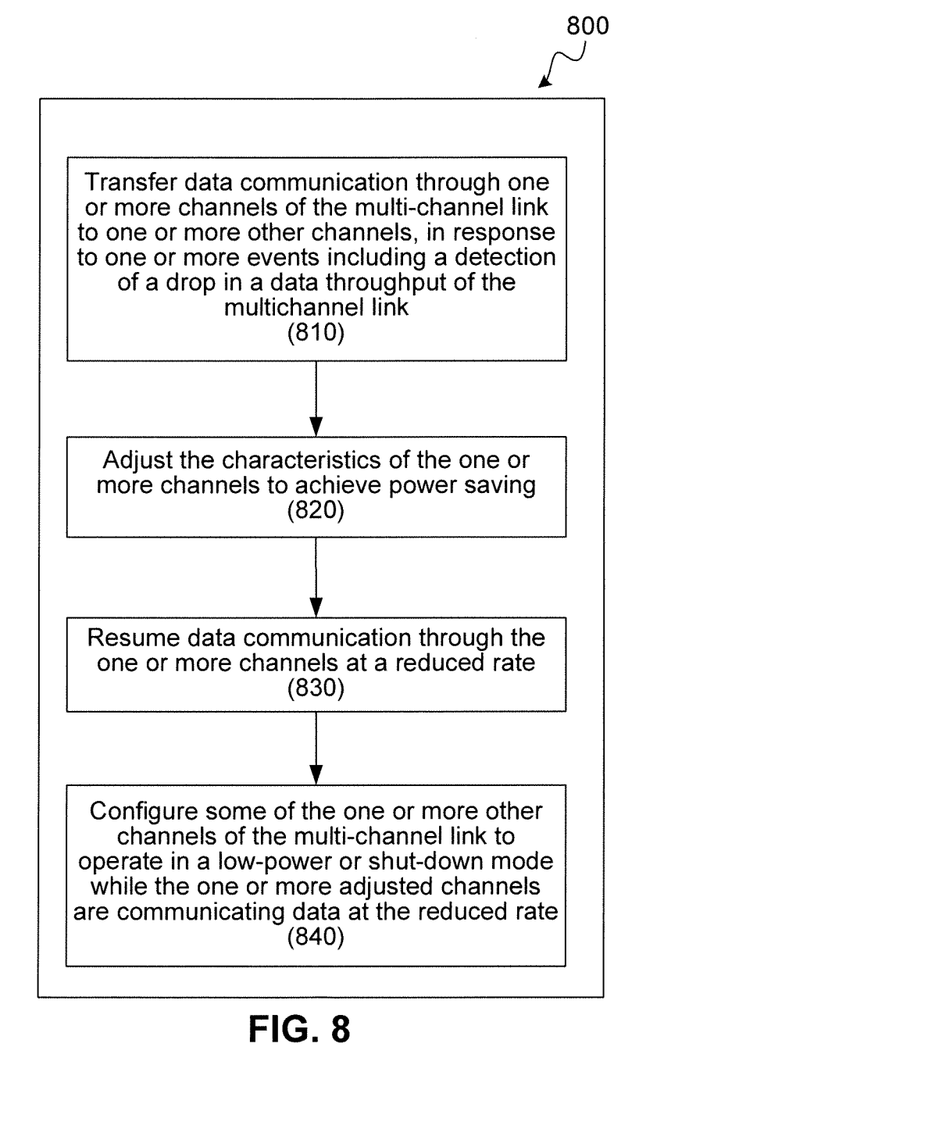
FIG. 8 illustrates an example method for power saving on multi-channel devices in accordance with one or more implementations.

FIG. 8 illustrates an example method 800 for power saving on multi-channel devices in accordance with one or more implementations of the subject technology. The method 800 may start at operation block 810, where in response to the detection of one or more events including a drop in the data throughput of the multi-channel link, data communication through at least one channel (e.g., channel 2 of FIG. 5B) of the multi-channel link may be transferred to one or more other channels (e.g., channel 1 of FIG. 5B). At operation block 820, the characteristics of the at least one channel may be adjusted (e.g., by 746 of FIG. 7) to achieve power saving. At operation block 830, the data communication through the at least one channel may be resumed (e.g., by 744 of FIG. 7) at a reduced rate (e.g., FIG. 5C).

At operation block 840, one or more channels of the multi-channel link may be configured to operate in a low-power or shut-down mode (e.g., by 744 of FIG. 7), while the at least one channel is communicating data at the reduced rate (e.g., FIG. 5E).

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for turning a multi-channel link into a power saving mode, the method comprising:
    transferring data communication transmitting through at least one channel link of the multi-channel link to one or more other channel links, in response to one or more events comprising a detection of a drop in a data throughput of the multichannel link, wherein the one or more other channel links, comprise one or more channel links of different channel link types;
    adjusting characteristics of the at least one channel link to achieve power saving;
    resuming the data communication through the at least one channel link at a reduced rate in response to completion of adjusting the characteristics of the at least one channel link; and
    configuring at least some of the one or more other channels of the multi-channel link to operate in one of a low-power mode or shut-down mode while the at least one channel link is communicating data at the reduced rate.

2. The method of claim 1, wherein:
    the multi-channel link comprises the multi-channel link between two chips, two devices, two systems, or a device and a system,
    the system comprises a network-coupled system,
    the network-coupled system comprises one or more devices or systems coupled via a network, and
    the one or more events further comprise a need for a decreased data throughput of the multi-channel link.

3. The method of claim 2, wherein the two devices comprises two set-top boxes (STBs) or a STB and a gateway, wherein the STB comprises a networked STB and the gateway comprises a DSL gateway.

4. The method of claim 2, wherein the multi-channel link comprise the multi-channel link between two digital subscriber line (DSL) equipments, wherein the DSL equipment is at least one of a DSL operator equipment or a DSL customer equipment, and wherein the DSL equipment is a very high-speed DSL (VDSL) equipment.

5. The method of claim 3, wherein adjusting the characteristics of the at least one channel link comprises changing an operating VDSL profile of the at least one channel link, and wherein changing the operating VDSL profile comprises changing the operating VDSL profile to a low power VDSL profile.

6. The method of claim 1, wherein the channel link types comprise an Ethernet channel, an optical channel, and a Wi-Fi channel, wherein at least two channels of the multi-channel link originate from a single port and end in another single port, and wherein the at least two channel links comprise a single physical channel operating at two or more frequency bands or wavelengths.

7. The method of claim 1, further comprising recovering from the power saving mode by:
    identifying a need for an increased data throughput of the multi-channel link;
    adjusting the characteristics of at least one of the one or more shut-down channel links to return to a normal mode of operation, in response to the identification of the need for the increased data throughput of the multi-channel link;
    resuming the data communication at a normal rate through the at least one channel link of the one or more shut-down channel links with adjusted characteristics;
    adjusting the characteristics of the at least one channel link of the multi-channel link; and
    resuming the data communication through the at least one channel link of the multi-channel link.

8. A system for turning a multi-channel link into a power saving mode, the system comprising:
    a detection module configured to detect one or more events comprising a drop in a data throughput of the multi-channel link;
    a control module configured to transfer data communication transmitting through at least one channel link of the multi-channel link to one or more other channel links, in response to the detection of the one or more events, wherein the one or more other channel links comprise one or more channel links of different channel link types;
    an adjustment module configured to adjust the characteristics of the at least one channel link to achieve power saving; and
    the control module further configured to:
        resume the data communication through the at least one channel link at a reduced rate in response to completion of adjusting the characteristics of the at least one channel link; and
        configure at least some of the one or more other channel links of the multi-channel link to operate in one of a low-power or shut-down mode while the at least one channel link is communicating data at the reduced rate.

9. The system of claim 8, wherein:
    the system comprises a first chip, device, or network-coupled system comprising one or more devices or systems coupled via a network,
    the system is coupled, via the multi-channel link, to a second chip, device, or network-coupled system, and
    the one or more events further comprise a need for a decreased data throughput of the multi-channel link.

10. The system of claim 9, wherein the first and second devices comprise set-top boxes (STBs) or a STB and a gateway, and wherein the STB comprises networked STB and the gateway comprises a DSL gateway.

11. The system of claim 9, wherein the first and second devices comprise two digital subscriber line (DSL) equipments, wherein the DSL equipment is at least one of a DSL operator equipment or a DSL customer equipment, and wherein the DSL equipment is a very high-speed DSL (VDSL) equipment.

12. The system of claim 10, wherein the adjustment module is further configured to adjust the characteristics of the at least one channel link by changing an operating VDSL profile of the at least one channel link, and wherein changing the operating VDSL profile comprises changing the operating VDSL profile to a low power VDSL profile.

13. The system of claim 8, wherein the channel link types comprise an Ethernet channel, an optical channel, and a Wi-Fi channel, wherein at least two channel links of the multi-channel link originate from a single port and end in another single port, and wherein the at least two channel links comprise a single physical channel operating at two or more frequency bands or wavelengths.

14. The system of claim 8, further comprising a recovery module configured to recover the multi-channel link from the power saving mode by using:
    the detection module to identify a need for an increased data throughput of the multi-channel link;
    the adjustment module to adjust the characteristics of at least one of the one or more shut-down channels to return to a normal mode of operation, in response to the identification of the need for the increased data throughput of the multi-channel link;
    the control module to resume the data communication at a normal rate through the at least one channel link of the one or more shut-down channel links with adjusted characteristics;
    the adjustment module to adjust the characteristics of the at least one channel link of the multi-channel link; and
    the control module to resume the data communication through the at least one channel link of the multi-channel link.

15. A system for turning a multi-channel link into a power saving mode, the system comprising:
    memory comprising one or more program modules; and
    a processor coupled to the memory and configured to execute the one or more program modules to:
        transfer data communication transmitting through at least one channel link of the multi-channel link to one or more other channel links, in response to one or more events comprising a detection of a drop in a data throughput of the multi-channel link, wherein the one or more other channel links comprise one or more channel links of different channel link types;
        adjust characteristics of the at least one channel link to achieve power saving;
        resume the data communication through the at least one channel link at a reduced rate in response to completion of adjusting the characteristics of the at least one channel link; and
        configure at least some of the one or more other channel links of the multi-channel link to operate in one of a low-power mode or shut-down mode while the at least one channel link is communicating data at the reduced rate.

16. The system of claim 15, wherein:
the multi-channel link comprises the multi-channel link between two chips, two devices, two systems, or a device and a system, wherein the system comprises a network-coupled system,
the network-coupled system comprises one or more devices or systems coupled via a network,
the two devices comprises two set-top boxes (STBs) or a STB and a gateway,
the STB comprises a Wi-Fi STB, and the gateway comprises a DSL gateway, and
the one or more events further comprise a need for a decreased data throughput of the multi-channel link.

17. The system of claim 15, wherein:
the multi-channel link comprise the multi-channel link between two digital subscriber line (DSL) equipments,
the DSL equipment is at least one of a DSL operator equipment or a DSL customer equipment, and
the DSL equipment is a very high-speed DSL (VDSL) equipment.

18. The system of claim 15, wherein the processor is further configured to execute the one or more program modules to adjust the characteristics of the at least one channel link by changing an operating VDSL profile of the at least one channel link, and wherein changing the operating VDSL profile comprises changing the operating VDSL profile to a low power VDSL profile.

19. The system of claim 15, wherein the channel link types comprise an Ethernet channel, an optical channel, and a Wi-Fi channel, wherein at least two channels of the multi-channel link originate from a single port and end in another single port, and wherein the at least two channel links comprise a single physical channel operating at two or more frequency bands or wavelengths.

20. The system of claim 15, wherein the processor is further configured to execute the one or more program modules to recover the multi-channel link from the power saving mode by:
identifying a need for an increased data throughput of the multi-channel link;
adjusting the characteristics of at least one of the one or more shut-down channel links to return to a normal mode of operation, in response to the identification of the need for the increased data throughput of the multi-channel link;
resuming the data communication at a normal rate through the at least one channel of the one or more shut-down channel links with adjusted characteristics;
adjusting the characteristics of the at least one channel link of the multi-channel link; and
resuming the data communication through the at least one channel link of the multi-channel link.

* * * * *